United States Patent
Cain et al.

(10) Patent No.: US 12,350,618 B2
(45) Date of Patent: Jul. 8, 2025

(54) APPARATUS FOR COLLECTION AND REMOVAL OF CONDENSATE LIQUID FROM A PROCESS VESSEL

(71) Applicant: MCI Engineering & Consulting, LLC, Dickinson, ND (US)

(72) Inventors: Travis Cain, Dickinson, ND (US); Matthew Moenkedick, Dickinson, ND (US)

(73) Assignee: MCI Engineering & Consulting, LLC, Dickinson, ND (US)

( * ) Notice: Subject to any disclaimer, the term of this patent is extended or adjusted under 35 U.S.C. 154(b) by 197 days.

(21) Appl. No.: 18/063,677

(22) Filed: Dec. 8, 2022

(65) Prior Publication Data
US 2023/0173404 A1 Jun. 8, 2023

Related U.S. Application Data

(60) Provisional application No. 63/287,488, filed on Dec. 8, 2021.

(51) Int. Cl.
*B01D 5/00* (2006.01)
*G05D 9/12* (2006.01)

(52) U.S. Cl.
CPC ............... *B01D 5/009* (2013.01); *G05D 9/12* (2013.01)

(58) Field of Classification Search
CPC .......................................... F04F 1/06
USPC ........................................ 417/118, 137, 138
See application file for complete search history.

(56) References Cited

U.S. PATENT DOCUMENTS

| | | | | | |
|---|---|---|---|---|---|
| 146,357 | A | * | 1/1874 | Prall | F04F 1/06 417/118 |
| 172,488 | A | * | 1/1876 | Prall | F04F 1/06 137/505.22 |
| 2,768,703 | A | * | 10/1956 | Parks | B01D 5/0045 62/902 |
| 3,028,098 | A | * | 4/1962 | Seidl | B61D 27/0036 237/40 |
| 3,216,648 | A | * | 11/1965 | Ford | F04B 25/00 62/93 |
| 3,254,497 | A | * | 6/1966 | Henry | C10G 5/00 96/120 |
| 3,498,493 | A | * | 3/1970 | Kemp | G01M 3/022 220/325 |
| 3,899,007 | A | * | 8/1975 | Miller | F16L 59/166 285/48 |
| 3,991,825 | A | * | 11/1976 | Morgan | E21B 43/121 417/58 |
| 4,227,489 | A | * | 10/1980 | Regamey | F22D 11/00 122/457 |
| 4,243,102 | A | * | 1/1981 | Elfarr | E21B 43/122 417/54 |

(Continued)

OTHER PUBLICATIONS

Jatco J-5000, 10-Gallon Environmental Tank—Jatko USA Ink, J-5000cx Manual, 34 pages, Webpage, admitted prior art.

*Primary Examiner* — Mark A Laurenzi
*Assistant Examiner* — Benjamin Doyle
(74) *Attorney, Agent, or Firm* — Booth Albanesi Schroeder PLLC; Peter V. Schroeder

(57) ABSTRACT

The disclosure provides a blowpipe assembly for removing at intervals liquid, such as pulled from a knockout assembly, having a three-way electrically operated valve, tuning fork level sensors, and access to the blowpipe interior.

16 Claims, 6 Drawing Sheets

(56) References Cited

U.S. PATENT DOCUMENTS

| | | | | |
|---|---|---|---|---|
| 4,579,565 A | * | 4/1986 | Heath | E21B 43/34 96/201 |
| 4,625,801 A | * | 12/1986 | McLaughlin | B09C 1/002 417/147 |
| 4,701,107 A | * | 10/1987 | Dickinson | F04B 43/10 417/86 |
| 4,899,807 A | * | 2/1990 | Vataru | F01P 11/06 123/41.14 |
| 4,974,626 A | * | 12/1990 | Koch | F16T 1/00 137/392 |
| 5,042,518 A | * | 8/1991 | Singhe | F04F 1/02 137/205 |
| 5,074,758 A | * | 12/1991 | McIntyre | F04F 1/06 417/139 |
| 5,080,126 A | * | 1/1992 | De Rycke | F16T 1/24 137/445 |
| 5,156,814 A | * | 10/1992 | Fielden | G05D 16/2013 417/18 |
| 5,401,142 A | * | 3/1995 | Yumoto | F16T 1/24 417/132 |
| 5,467,608 A | * | 11/1995 | Cording | F25B 45/00 62/126 |
| 5,531,240 A | * | 7/1996 | Kelada | B67D 7/32 137/15.16 |
| 6,036,446 A | * | 3/2000 | Goodman | F01M 11/045 417/54 |
| 6,279,593 B1 | * | 8/2001 | Sheppard | F16T 1/00 137/181 |
| 6,368,067 B1 | * | 4/2002 | Stutz | F04F 1/12 417/54 |
| 6,394,042 B1 | * | 5/2002 | West | F24H 1/28 122/367.2 |
| 6,935,844 B1 | * | 8/2005 | Dukes | F04F 1/06 137/418 |
| 8,137,076 B2 | * | 3/2012 | Braun | F04F 1/02 417/388 |
| 8,535,018 B2 | * | 9/2013 | Bouvier | F04F 3/00 417/118 |
| 8,662,357 B2 | * | 3/2014 | Centofante | B65D 47/04 222/553 |
| 8,992,838 B1 | * | 3/2015 | Mueller | B01J 8/001 422/129 |
| 9,334,109 B1 | * | 5/2016 | Mueller | C10G 5/06 |
| 10,042,371 B2 | * | 8/2018 | Borkowski | F16T 1/00 |
| 10,234,077 B1 | * | 3/2019 | Pilcher | F17D 3/16 |
| 11,662,298 B1 | * | 5/2023 | Fontaine | G01N 17/002 73/866 |
| 2002/0129938 A1 | | 9/2002 | West et al. | |
| 2002/0157705 A1 | * | 10/2002 | Schlensker | F16T 1/00 137/187 |
| 2004/0074838 A1 | * | 4/2004 | Hemstock | B01D 21/0006 210/513 |
| 2004/0151597 A1 | * | 8/2004 | Dukes | F04F 1/06 417/133 |
| 2004/0261632 A1 | * | 12/2004 | Hansen | F24C 15/327 99/468 |
| 2005/0226734 A1 | * | 10/2005 | Soares | F04F 1/02 417/63 |
| 2006/0115365 A1 | * | 6/2006 | Armer | F04F 1/06 417/6 |
| 2009/0084165 A1 | * | 4/2009 | Carson | G01M 3/022 73/49.8 |
| 2009/0129958 A1 | * | 5/2009 | Page, Jr. | F04F 1/06 417/521 |
| 2012/0275927 A1 | * | 11/2012 | Rhim | F04B 49/10 417/36 |
| 2012/0285896 A1 | * | 11/2012 | Black | B01D 17/047 210/741 |
| 2013/0056089 A1 | * | 3/2013 | Platusich | F16T 1/14 137/178 |
| 2014/0110335 A1 | * | 4/2014 | Early | B01D 21/2433 417/118 |
| 2015/0096385 A1 | * | 4/2015 | Downie | G01F 1/74 73/861.04 |
| 2016/0256842 A1 | * | 9/2016 | Evans | B01J 8/0015 |
| 2017/0065932 A1 | * | 3/2017 | Al-Kuait | E21B 43/34 |
| 2017/0157527 A1 | * | 6/2017 | Kopel | B01D 5/0051 |
| 2018/0003342 A1 | * | 1/2018 | Kunkel | F17C 1/00 |
| 2018/0015431 A1 | * | 1/2018 | Rueter | B01F 23/23123 |
| 2018/0209875 A1 | * | 7/2018 | Curtis | G05D 9/12 |
| 2019/0032848 A1 | * | 1/2019 | Miller | F01K 25/08 |
| 2021/0348704 A1 | * | 11/2021 | Smith | F16L 23/028 |
| 2022/0390171 A1 | * | 12/2022 | Ansari | F25J 1/0292 |
| 2023/0078864 A1 | * | 3/2023 | Androutsos | F04F 1/06 417/118 |

\* cited by examiner

APPARATUS FOR COLLECTION AND REMOVAL OF CONDENSATE LIQUID FROM A PROCESS VESSEL

CROSS-REFERENCE TO RELATED APPLICATION

This is a U.S. Non-Provisional Application claiming priority to the earlier-filed U.S. Provisional Application Ser. No. 63/287,488, filed Dec. 8, 2021.

FIELD OF THE DISCLOSURE

The disclosure relates generally to periodic removal of liquid from a blowpipe.

BACKGROUND

A blowcase system, or pressure vessel system, is a system that collects fluid, at a relatively low pressure, and then, upon being filled is pressurized with relatively higher pressure gas which causes the collected fluid to exit the pressure vessel through a selected outlet system. The pressure vessel system basically performs the function of a pump, utilizing high pressure gas to displace fluid from the vessel.

Pressure vessel systems are often used in conjunction with flare knockout (KO) drums and are a key component of the flare system. The knockout drum is used to slow down gas flow by creating a pressure drop, allowing liquids and condensate to fall out as condensate of a vented gas stream ahead of combustion in the flaring system.

The condensate is drained to a blowcase which temporarily collects the liquid which is then periodically evacuated from the blowcase to a downstream use. The blowcase often uses a level float to determine the liquid level in the blowcase, which operates by mechanical linkage to move an actuator. In many cases, the actuator operates a switch with a pressurized gas supply for pneumatically moving a switch actuator. The switch actuator operates a three-way pneumatic valve which opens a line from a high pressure motive gas source to the blowcase. The pressurized gas evacuates, or "blows down," the blowcase of liquid. In some cases the motive gas is natural gas from the facility. One the liquid level has dropped, as measured by the float level, the process is reversed, returning the blowcase to collecting condensate for the next cycle. Similar systems are used as components as pressure-relief systems and condensate removers in various industries.

There are shortcomings to the prior art knockout and blowcase system, including the pressure relief valve assembly, the level float assembly, the mechanical switch, the three-way pneumatic valve, and the difficulty of accessing the interior of the pressure vessel for repairs and maintenance. The blowcase pressure vessel is large enough, per ASME (American Society of Mechanical Engineers) standards, to require certification of design and is required to have a safety pressure relief valve. Relief valves must be routed to a safe area, resulting in additional costs and safety concerns. Further, the relief valve must be periodically taken out of service and tested to ensure it is operating within its design parameters. Servicing and replacement results in added costs associated with shut down time and valve replacement.

The level float in the blowcase is mechanical in nature, as it requires the liquid in the blowcase to move the valve up and down to activate the switch. Level floats are known to "gum up" and stop moving, or to corrode to the point of breaking off. The switch is a mechanically actuated 3-way valve which has been known to wear out and fail, and requires an actuator pressurized gas source. The 3-way pilot valve is pneumatically actuated, often with raw, dirty or wet gas from the wellhead. These pilot valves have been known to "gum up" with the dirty gas and fail to actuate.

Finally, the blowcase does not have an inspection port. Consequently, a user cannot inspect or perform maintenance on the inside of the vessel, in case of debris causing plugging, a float switch breaks off, etc. Some repairs may require removal of the blowcase so it can be turned upside down to try and fish-out debris or a failed float switch, often through a small, 2 inch diameter opening. Alternately, the blowcase must be cut open, such as with a blowtorch, requiring significant repair to place the blowcase back into usable condition. Improvements are needed to overcome these shortcomings.

BRIEF DESCRIPTION OF THE DRAWINGS

Drawings of the preferred embodiments of the present disclosure are attached hereto so that the embodiments of the present disclosure may be better and more fully understood, wherein.

DETAILED DESCRIPTION

Figure 1:
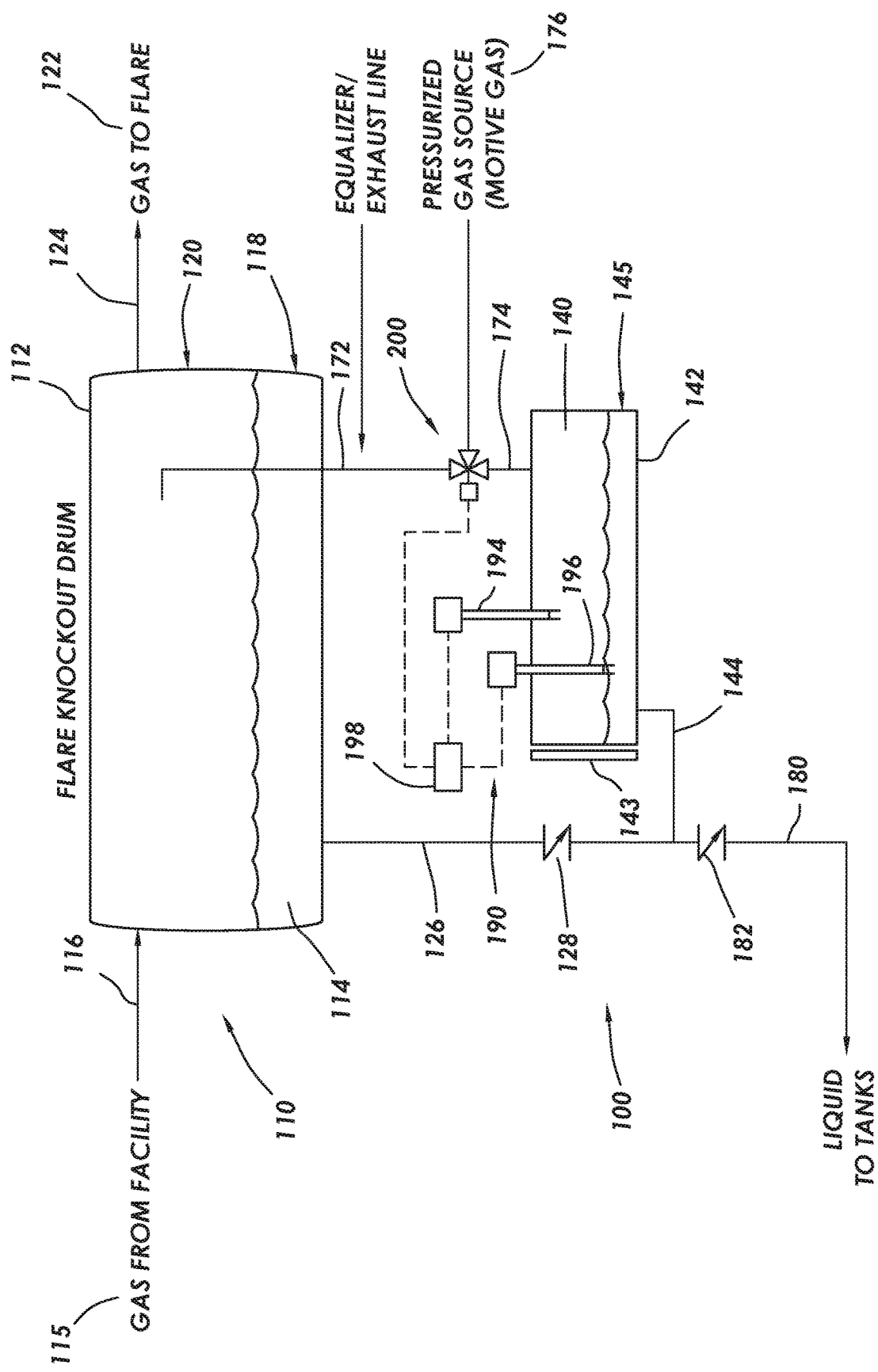
FIG. 1 is a schematic of an exemplary knockout system and blowpipe assembly according to some aspects of the disclosure.

FIG. 1 is a schematic of an exemplary embodiment of a blowpipe system 100 according to aspects of the invention. Generally, raw natural gas from the facility (e.g., wellhead) flows through a knockout drum on its way to be flared or otherwise processed downstream. Condensate is pulled from the gas in the knockout drum. Pressure is equalized across the drum and blowpipe via appropriate fluid lines such as the equalizer or exhaust line. Condensate is drained, using gravity, to the lower elevation blowpipe via appropriate condensate lines. Once the liquid level in the blowpipe rises to make contact with a high-level tuning fork sensor, the sensor communicates electronically to the electric controller. The controller energizes the three-way valve, which is electrically powered (not pneumatic), to change the position of the valve. The system is now in blow down mode, allowing pressurized motive gas to flow into the blowpipe and evacuate the condensate. Once the condensate level is blown down far enough, the liquid level drops below the low-level tuning fork sensor. The low tuning fork sensor communicates this condition to the controller which actuates the three-way valve, returning the system back to equalization mode, allowing condensate to again build up into the blowpipe.

An exemplary blowpipe system 100 is seen in FIG. 1 in use with an exemplary knockout system 110. The knockout system 110 includes a knockout drum 112 and is used to collect liquid condensate 114 from a stream of raw, moisture-bearing, natural gas 115 which enters the drum through an inlet line 116. As the raw gas flows through the knockout drum, condensate falls out of the raw gas stream and into the bottom of the drum. The condensate 114 drops out of the stream 115 and collects in a liquid zone 118 at the bottom of the drum 112. The upper portion of the drum defines a gas zone 120 filled with natural gas. Now relatively dry gas 122, exits the drum through an outlet line 124. The dry gas 122 is discharged for downstream use or disposal. The condensate separated from the raw gas is collected in a blowpipe 142 for temporary storage and flow control, to be used elsewhere at the site or disposed of.

The condensate 114 is drained from the knockout drum 112 via a condensate outlet line 126 at the bottom of the drum to the blowpipe 142. The blowpipe is at a lower elevation so gravity drains condensate to the blowpipe. The condensate outlet line 126 includes a check valve 128 or the like, to prevent condensate from flowing back into the knockout drum 112. The condensate 114 is temporarily stored in the blowpipe 142 having a condensate line 144 in fluid communication with the knockout drum condensate outlet line 126.

A blowpipe assembly 100 is provided downstream from the knockout drum 112. Condensate 114 from the drum flows into the interior space 140 of the blowpipe 142 through condensate line 144. The condensate pools in liquid zone 145. The blowpipe is generally cylindrical. The blowpipe, in some embodiments, is not an ASME pressurized vessel, that is, is not large enough per ASME standards or boiler codes to require meeting certain ASME requirements for pressure vessels. For example, the blowpipe can be a pipe having a six inch diameter or less. ASME Boiler and Pressure Vessel Code in effect at the time of filing of this document does not recognize piping of six inches and smaller as pressurized vessels requiring certification or standards. Consequently, the blowpipe does not require a pressure relief valve or the like. As an unregulated, non-certified pressure vessel, the blowpipe does not require a U-stamp. Further, no maintenance, testing or replacement of a relief valve is required. The blowpipe, for example, can be fabricated from Schedule 40 ("SCH 40") six inch diameter pipe.

The blowpipe 142 is capped with an end cap 143, such as a blind flange or cover, which is easily removed or opened for maintenance and repair of the blowpipe and its interior components. The end cap is easily removable and replaceable by fasteners known in the art, such as bolt and nut assemblies and the like. The end cap can be, for example, an American National Standards Institute (ANSI) 150 RF flange. Removal or opening of the end cap grants the user easy access to the interior of the blowpipe and accessories therein.

The blowpipe, in some embodiments, utilizes an inlet splash plate 193 that controls flow of condensate into the blowpipe. The splash plate is designed and positioned to reduce the potential for splashing, waves, and other undesirable flow patterns that could disrupt the system, prematurely or irregularly trigger evacuation of the blowpipe, etc.

The blowpipe assembly 100 includes a condensate level sensor assembly 190 for detecting the condensate level in the blowpipe. The condensate level assembly comprises a high-level tuning fork sensor 194 and a low-level tuning fork sensor 196. A tuning fork vibrates at its known resonance frequency. In the sensor device, the tuning fork vibrates in response to electric power, such as by a piezoelectric device. When the tuning fork is in contact with the liquid condensate, the resonant frequency of the fork changes. A change in frequency is detected by the sensor device and an appropriate electrical signal is sent by the device. Tuning fork level sensors are commercially available. The high-level tuning fork sensor is mounted with the tuning fork extending into the blowpipe to a preselected high level. Similarly, the low-level tuning fork sensor is mounted is mounted with the tuning fork extending into the blowpipe to a preselected low level. The control and upper portions of the tuning fork sensors may extend to the exterior of the blowpipe. The tuning fork sensors used as fill indicators eliminate the need for a float valve. The tuning fork level sensors are more robust than float valves. The tuning fork level sensors are preferably made entirely of stainless steel so there is low corrosion potential and no linkage or physical actuator parts to fail.

The tuning fork level sensors 194 and 196 are electrically or wirelessly connected or connectable to an electric controller 198 which can receive electrical signals, such as analog electrical signals, digital signals, Bluetooth signals, Wi-Fi signals and the like, from the tuning fork sensors. The electric controller 198 is operable to activate an electrically actuated three-way valve assembly 200. The controller and valve are electrically or wirelessly connected or connectable. Use of a microswitch is eliminated in such an embodiment. The controller 198, which can be an assembly of connected or operable elements, in some embodiments sends monitoring signals or alerts to the user, preferably wirelessly to a receiving device at a location readily accessible to the user. The controller allows the user to remotely monitor the system for any abnormal conditions and can send an alert to the user.

A three-way electrically activated valve assembly 200 is operated by a controller 198 by electrical signal between the controller to the valve. The three-way valve assembly 200 fluidly, and selectively, connects a pressure equalizer line 172 which extends into the interior of the knockout drum 112 in the gas zone 120, a blowpipe gas inlet line 174 which extends into the blowpipe interior, and a motive gas pressure source 176. The motive gas pressure source can be, for example, relatively higher pressure gas from the facility, or gas from sources which have been pressurized by a pump or compressor. The use of an electrically actuated three-way valve results in a lower potential for the valve to "gum up" or fail, especially when flowing raw, dirty or wet process gas.

A condensate discharge line 180 is provided, fluidly connected to the blowpipe condensate line 144 and knockout drum condensate outlet line 126 for discharging the condensate to a downstream location, such as a storage tank. The discharge line 180 can include a check vale 182 to prevent condensate from backing through the discharge line.

When the blowpipe assembly 140 is in an equalizer mode, or exhaust mode, the interior pressures of the knockout drum and blowpipe are equalized via communication of pressure between the drum and blowpipe by the equalizer line 172 and gas inlet line 174 through the three-way valve 200. The gas pressure is communicated through the line 172, three-way valve 200, gas inlet line 174 to the blowpipe 142.

Once the condensate liquid level in the blowpipe rises to contact the high level tuning fork sensor 194 at a preselected height, the sensor 194 sends a signal to the controller 198. The controller 198, in turn, sends a signal to electrically actuate the three-way valve 200. This changes the three-way valve 200 to actuation or "blow down" mode, in which the three-way valve 200 cuts pressure communication between the drum 112 and blowpipe 142 and opens fluid communication of the motive force gas from the motive gas source 176 to the blowpipe. The motive force gas is a relatively high-pressure gas which flows through the valve 200 and into the blowpipe 142. The motive pressurized gas evacuates the condensate out of the blowpipe to, for example, facility tanks through the condensate line 144 and discharge line 180. Check valve 182 prevents condensate from traveling back to the knockout drum.

Once the condensate has been evacuated to a preselected level, the process is reversed, placing the system in equalization mode once again. As the condensate level is blown down, the condensate level falls until the low level tuning fork sensor 196 is no longer in contact with the condensate in zone 145. The low level tuning fork sends a signal to the controller 198, and the controller sends a signal to actuate the three-way valve. The valve moves to equalization mode, cutting off the motive gas and opening fluid connection between the knockout drum and blowpipe, again equalizing pressure across the blowpipe and drum. Condensate from the drum drains into the blowpipe again and the process repeats.

Figure 2:
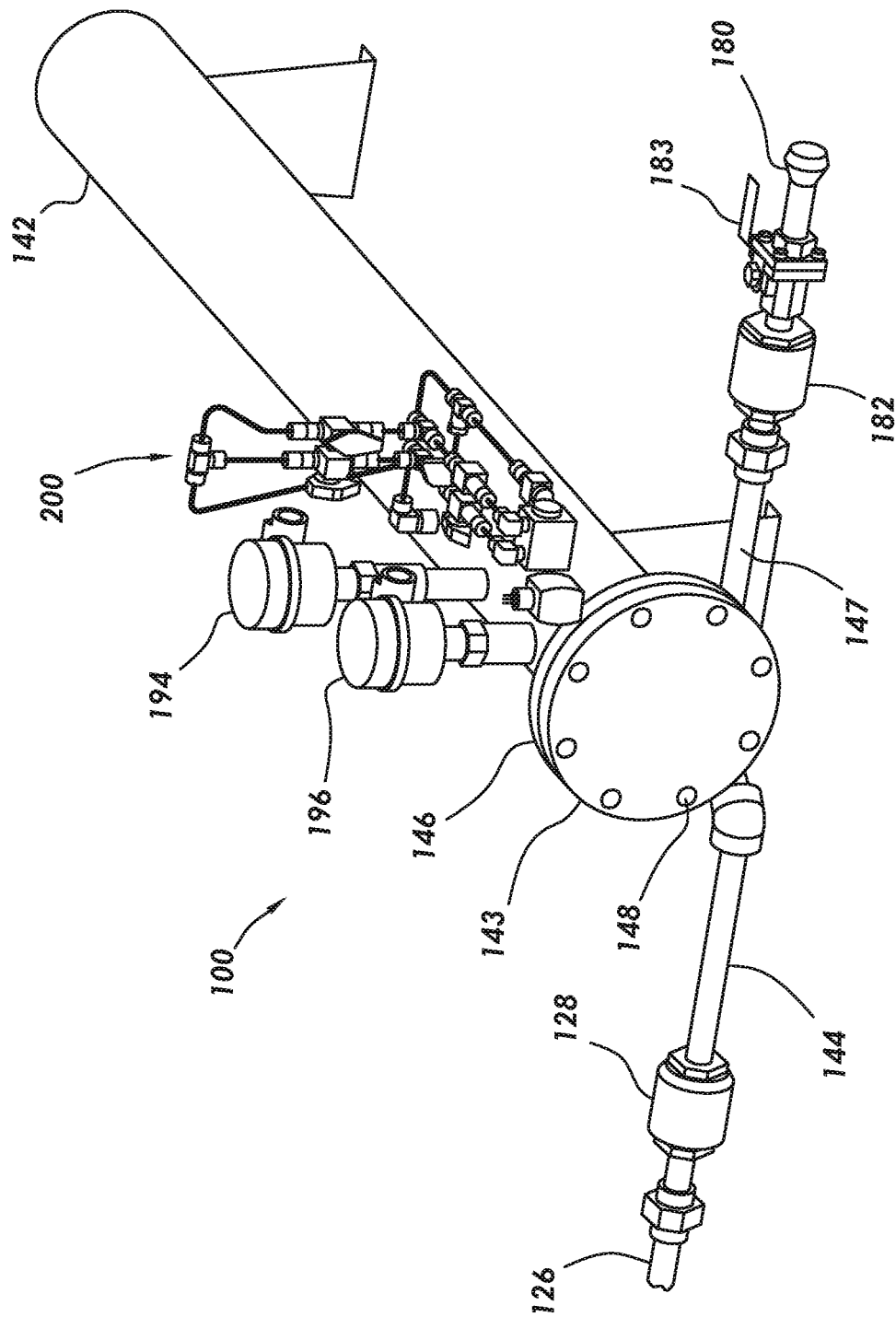
FIG. 2 is an orthogonal view of an exemplary blowpipe system according to aspects of the disclosure.
Figure 3:
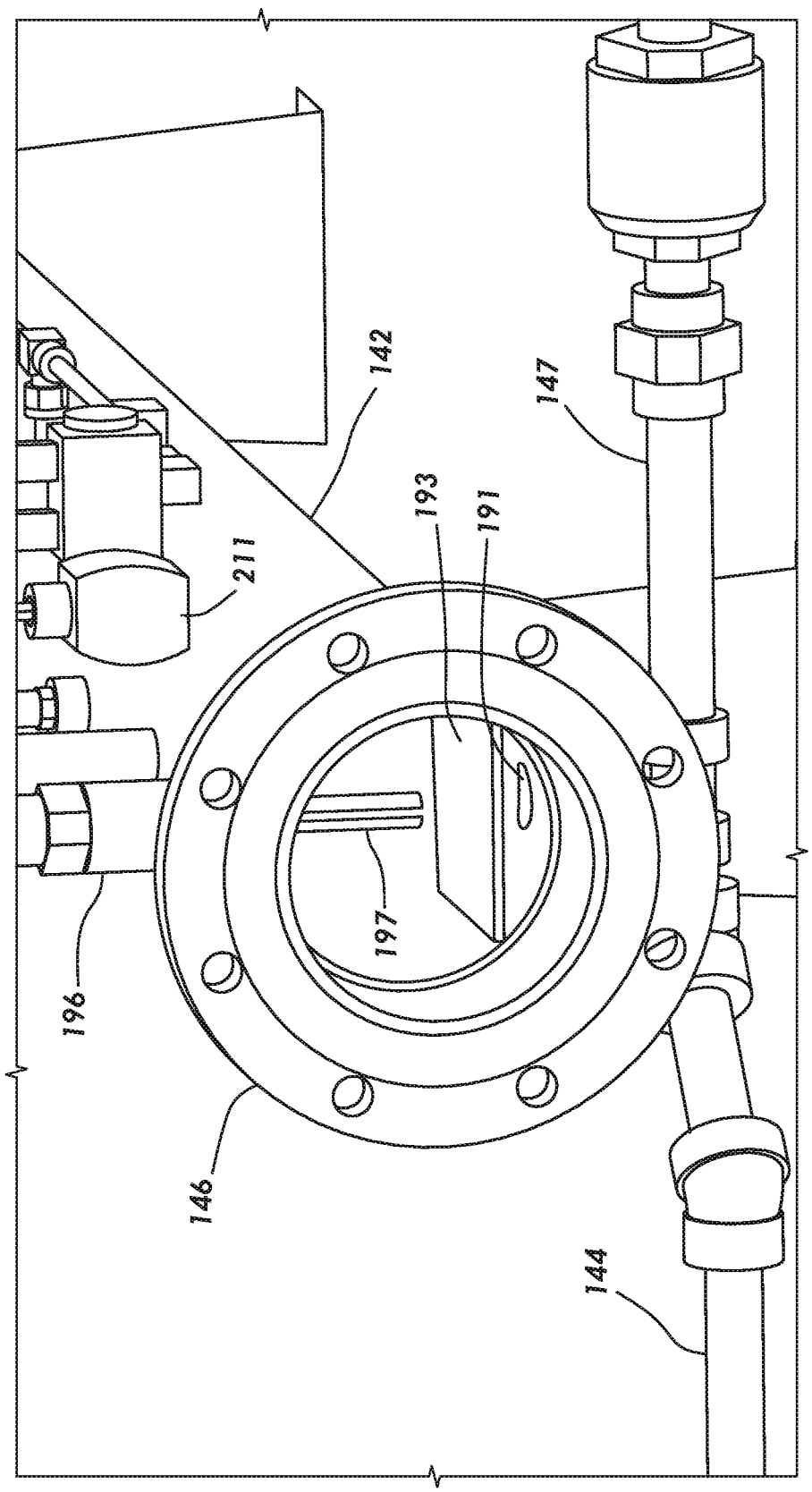
FIG. 3 is an end orthogonal view of the blowpipe assembly of FIG. 2 with the blind flange or end cap removed, showing the interior of the blowpipe.
Figure 4:
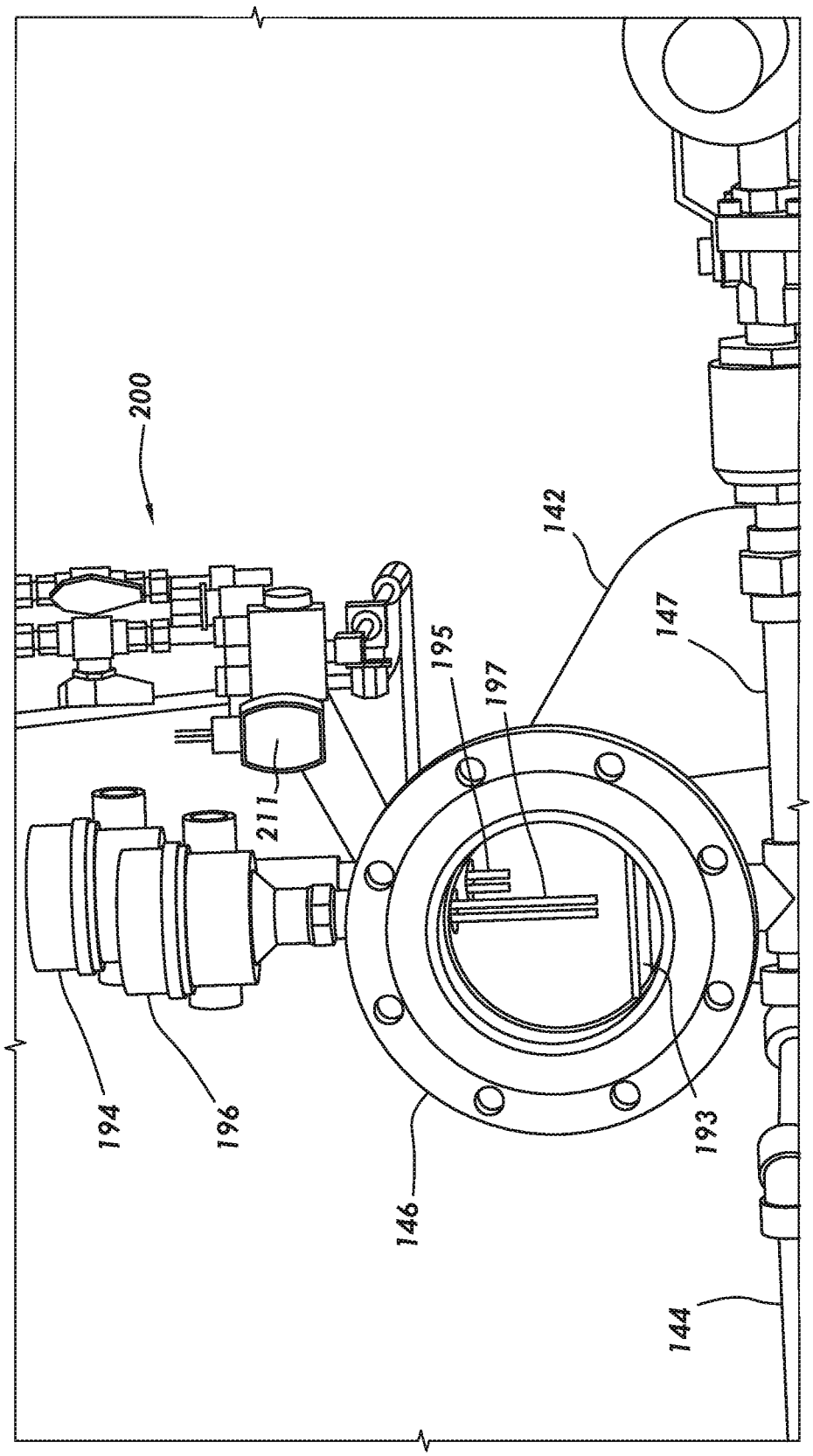
FIG. 4 is an end view of the blowpipe assembly of FIG. 2 with the end cap removed showing the interior of the blowpipe.
Figure 5:
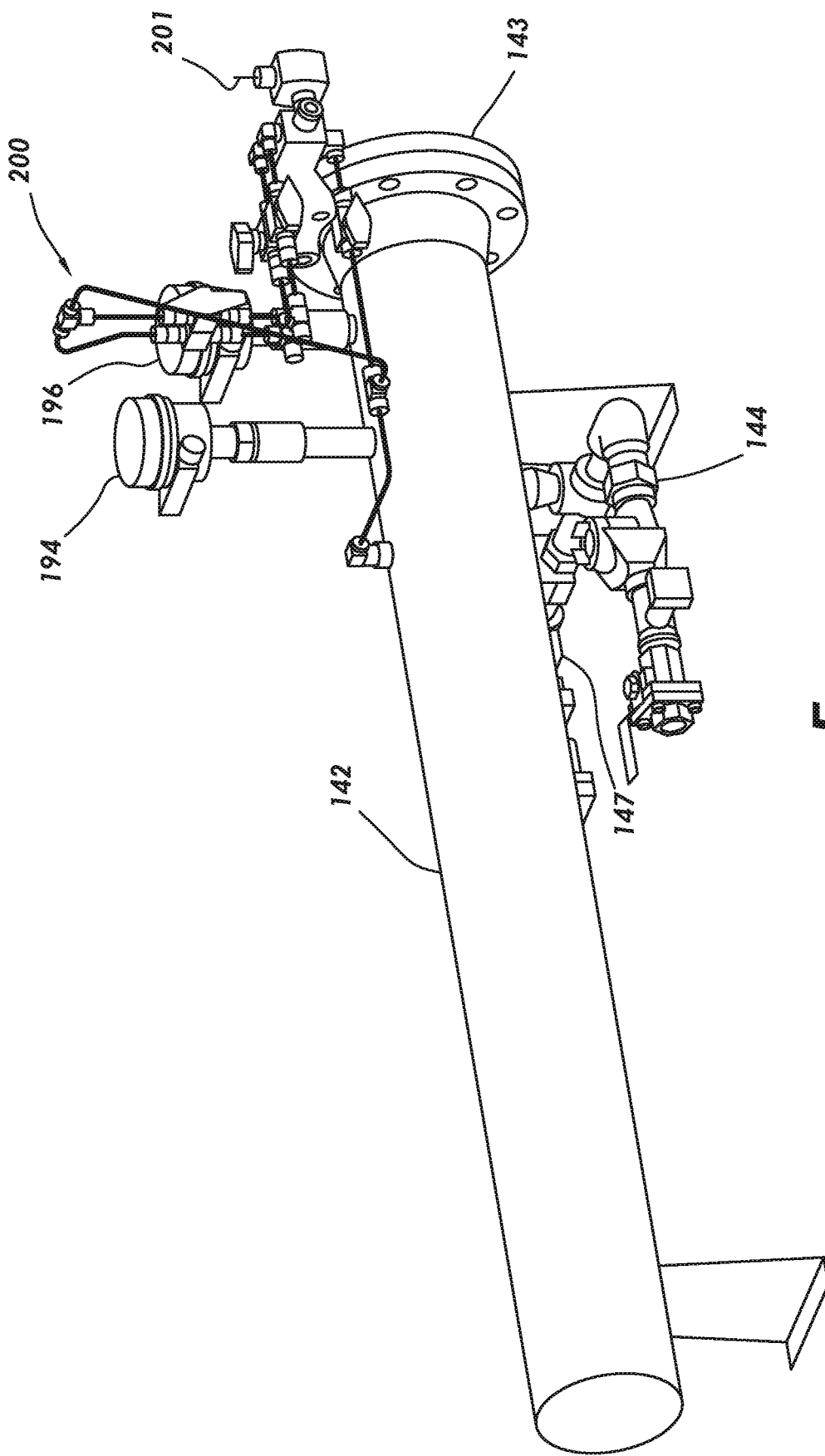
FIG. 5 is an orthogonal view of the blowpipe assembly of FIG. 2.
Figure 6:
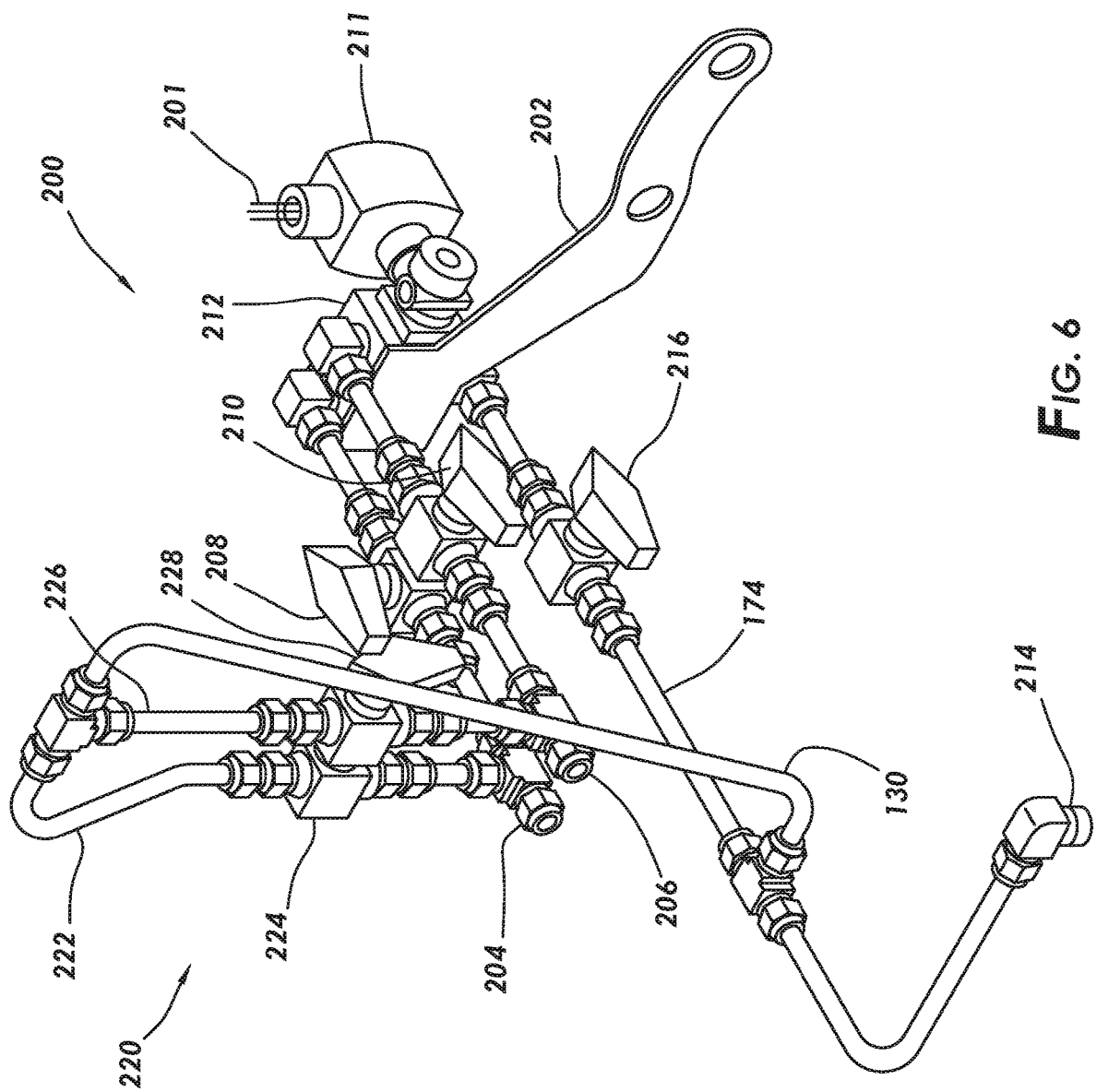
FIG. 6 is an orthogonal view of an exemplary valving system of the blowpipe assembly of FIG. 2 according to some aspects of the disclosure.

FIG. 2 is an orthogonal view of an exemplary blowpipe system according to aspects of the disclosure. FIG. 3 is an end orthogonal view of the blowpipe assembly of FIG. 2 with the blind flange or end cap removed, showing the interior of the blowpipe. FIG. 4 is an end view of the blowpipe assembly of FIG. 2 with the end cap removed showing the interior of the blowpipe. FIG. 5 is an orthogonal view of the blowpipe assembly of FIG. 2. FIG. 6 is an orthogonal view of an exemplary three-way valving system of the blowpipe assembly of FIG. 2 according to some aspects of the disclosure. The figures will be discussed together.

The blowpipe 142 is seen as a cylindrical vessel, six inches in diameter and having a removable six inch blind flange 143 for ease of access, maintenance and repair. The blind flange 143 has a plurality of bolt holes which cooperate with corresponding bolt holes defined in a flange 146 on the blowpipe. Bolt and nut assemblies 148 are utilized to secure and remove the end cap from the blowpipe.

A condensate outlet line 126 from the knockout drum has a check valve 128 and is fluidly connected to condensate inlet line 144 of the blowpipe assembly. The condensate inlet line 144 is fluidly connected to the blowpipe 142 at an inlet to deliver condensate to the blowpipe interior. A condensate outlet line 147 of the blowpipe 142 is fluidly connected to the interior of the blowpipe and to the condensate discharge line 180, which has a check valve 182. Also present is a manual isolation valve 183. A splash plate 193 is mounted in the interior of the blowpipe, positioned adjacent the condensate port 191.

A high level tuning fork sensor assembly 194 and a low level tuning fork sensor assembly 196 are mounted to the blowpipe 142 with the tuning forks 195 and 197, respectively, extending into the interior of the blowpipe to selected levels. As condensate fills the blowpipe, the low level tuning fork 197 will contact the liquid, the ends of the fork in the condensate. As the blowpipe continues to fill, the high level tuning fork ends will contact the rising condensate, triggering a signal from the tuning fork assembly to a controller 198. Similarly, as the liquid level falls during blow down, the low level tuning fork ends will eventually at the level of the condensate. The low level tuning fork sensor sends a signal to the controller to return the system to the equalization mode.

A three-way electrically operated valve 200 is operated by a controller and movable between an equalizer mode, in which fluid communication is established between the interiors of the knockout drum and the blowpipe, and a blow down or actuation mode, in which fluid communication is established between a high pressure motive gas source and the interior of the blowpipe. The electrically operated three-way valve 200 includes an electrical connection 201 for connecting to a power source and/or a controller.

Also seen in FIGS. 2-5 is an exemplary three-way valve assembly 200 mounted to the blowpipe 142; FIG. 6 is the best view for details of the assembly. The exemplary three-way valve assembly 200 includes an electric connection 201 for providing power and or control of the valve assembly. Power is supplied to the three-way valve actuator that is mechanically coupled to a manifold or valve body 212. A mounting bracket 202, optional, is seen.

The three-way valve assembly 200 has an equalizer gas inlet line 204 for fluid connection to the equalizer line 172, and a motive gas inlet line 206 for fluid connection to the pressurized motive gas source 176. Isolation valves 208 and 210 are provided, respectively, for further control of the inlet lines. A valve manifold or body 212 fluidly connects to the inlet lines and the gas inlet line 174 which provides fluid connection to the interior of the blowpipe 142 at a connector 214. An actuator 211 is mechanically coupled to the manifold or valve body 212. An isolation valve 216 is provided for further control of the piping assembly.

The three-way valve assembly 200 includes, in an exemplary embodiment, a manual bypass assembly 220 having a bypass equalizer gas line 222 with isolation valve 224, a bypass motive gas line 226 with isolation valve 228, and a bypass gas feed line 230 which fluidly connects to the gas inlet line 174.

The apparatus and systems disclosed herein are described for use with a flare knockout drum specifically, and in the oilfield in general. Persons of skill in the art will understand that the apparatus and systems can also be used in any application wherein it is desirable to remove condensate or other liquid from a process vessel.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The disclosure should therefore not be limited by the above-described embodiments, methods, and examples. While this disclosure has been described with reference to illustrative embodiments, this description is not intended to be construed in a limiting sense. Various modifications and combinations of the illustrative embodiments as well as other embodiments of the disclosure will be apparent to persons skilled in the art upon reference to the description. It is, therefore, intended that the appended claims encompass any such modifications or embodiments.

It is claimed:

1. A blowpipe assembly for removing condensate from a knockout drum, the blowpipe assembly comprising:
    a generally cylindrical blowpipe defining an interior, the blowpipe having a first end sealingly covered by a removable end cap,
    the blowpipe having a diameter of no more than six inches,
    a condensate inlet line for supplying condensate from the knockout drum to the blowpipe;
    a condensate outlet line for discharging condensate from the blowpipe;

a condensate level sensor assembly having a first tuning fork level sensor operably positioned to sense a first selected level of condensate in the blowpipe, and a second tuning fork level sensor operably positioned to sense a second selected level of condensate in the blowpipe;

an electrically actuated three-way gas valve for selectively controlling, in response to signals from the first and second tuning fork level sensors, gas communication between the interior of the blowpipe and, alternately, a high pressure motive gas source for evacuating the blowpipe of condensate through the condensate outlet line, and a gas pressure equalizer line for equalizing gas pressure between the knockout drum and the blowpipe.

2. The blowpipe assembly of claim 1, wherein the end cap is a blind flange attached by a plurality of bolt and nut assemblies to the blowpipe.

3. The blowpipe assembly of claim 1, further comprising an electric controller operable to receive signals from the first and second tuning fork level sensors, and to send signals to actuate the three-way valve.

4. The blowpipe assembly of claim 3, wherein the condensate inlet line is connected to the bottom of the knockout drum at a liquid zone of the knockout drum.

5. The blowpipe assembly of claim 1, wherein the controller is operable to wirelessly send alerts to a remote user.

6. The blowpipe assembly of claim 1, wherein the blowpipe assembly is without a relief valve.

7. The blowpipe assembly of claim 1, further comprising a splash plate mounted in the interior of the blowpipe and positioned adjacent a port in the blowpipe connected to the condensate inlet line.

8. A method of periodically draining condensate from a blowpipe, the method comprising:

draining condensate, pulled from a condensate-laden gas stream in a knockout drum, into a generally cylindrical blowpipe through a condensate inlet line;

collecting condensate in an interior of the blowpipe;

sensing a first level of condensate in the blowpipe using a first tuning fork level sensor operably positioned in the interior of the blowpipe;

in response to sensing the first level of condensate, moving an electrically actuated three-way gas valve to a blow down position;

in response to moving the valve to the blow down position, communicating motive gas through the three-way gas valve and into the interior of the blowpipe;

in response to communicating motive gas into the blowpipe, evacuating at least a portion of the collected condensate from the blowpipe; and moving the three-way gas valve to an equalizing position wherein gas communicates between the blowpipe and the knockout drum through the three-way gas valve.

9. The method of claim 8, further comprising: sensing a second level of condensate in the blowpipe using a second tuning fork sensor; and in response to sensing the second level of condensate, moving the three-way gas valve to the equalizing position.

10. The method of claim 8, wherein moving the three-way gas valve to the equalizing position further comprises providing fluid communication between the interior of the blowpipe and an interior of a knockout drum.

11. The method of claim 10, further comprising: draining the condensate from the interior of the knockout drum through the condensate inlet line.

12. The method of claim 8, further comprising never releasing pressure from the interior of the blowpipe through a pressure relief valve.

13. The method of claim 8, wherein the blowpipe comprises a first generally circular open end, an end cap sealingly covering the first open end; and further comprising, removing the end cap, accessing the interior of the blowpipe, and then replacing the end cap.

14. The method of claim 8, further comprising sending an electrical signal from the first tuning fork sensor to a controller, and sending an electrical signal from the controller to the three-way gas valve.

15. The method of claim 14, further comprising sending an alert signal wirelessly to a user.

16. The method of claim 8, wherein the blowpipe is unregulated by AMSE standards due to the small size of the blowpipe.

* * * * *